July 13, 1954   P. LETRILLIART ET AL   2,683,827
COMMUTATOR ELECTRICAL MACHINE
Filed Feb. 11, 1953
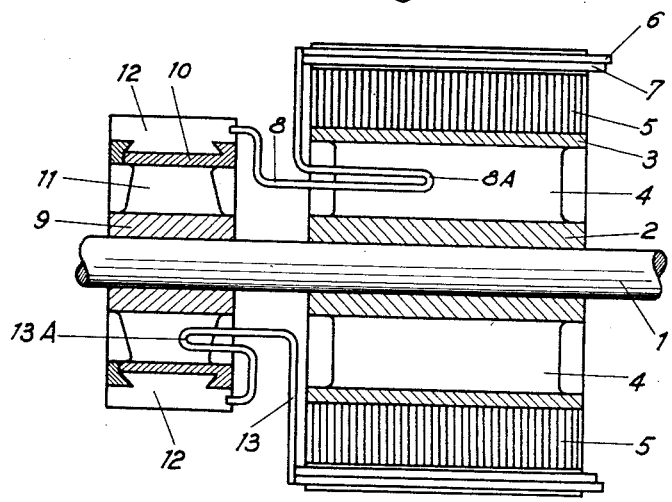
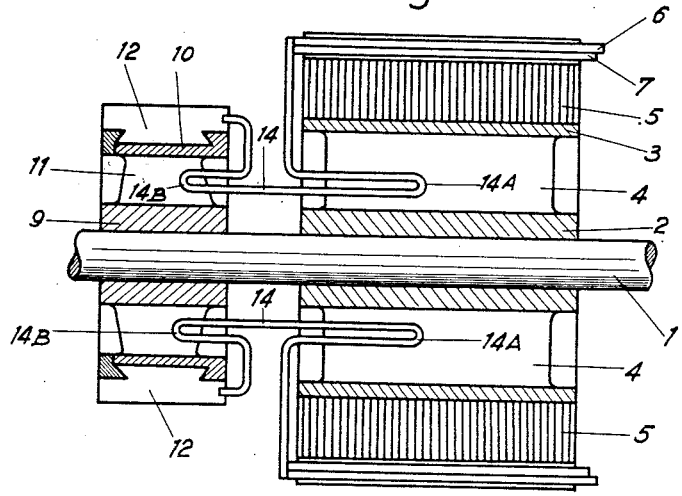

Patented July 13, 1954

2,683,827

UNITED STATES PATENT OFFICE 2,683,827

COMMUTATOR ELECTRICAL MACHINE

Pierre Letrilliart and Jean Delastre, Jeumont, France, and Louis Buchet, Binche, Belgium, assignors to Forges & Ateliers de Constructions Electriques de Jeumont, Paris, France, a corporation of France Application February 11, 1953, Serial No. 336,406

Claims priority, application France February 20, 1952

5 Claims. (Cl. 310—220)

1

The present invention relates to electrical machines having commutators.

In commutator machines, such as traction motors operating on single-phase current for example, resistance connections have been used between the armature coils and the blades or segments of the commutator, in order to reduce the short circuit current in the windings in commutation. In order to elongate the connections and give them the desired resistance values, it has been proposed to let the connections pass through a central bore of the annular armature. However, this arrangement gives rise to disturbing induction phenomena, due to the fact that the resistance connections pass in the vicinity of the arms or spokes supporting the armature, resulting in the production of a magnetic field and eddy currents in the spokes, with undesirable reactances and losses.

It is an object of the present invention to overcome these disadvantages by an improved arrangement of the resistance connections which virtually eliminates their magnetic effects. A further object of the invention is to assure efficient ventilation and cooling of the resistance connections and to provide resistance of the desired value without undesirable heating.

In accordance with the invention, the resistance connections between the armature windings and the commutator segments are in the form of hairpin loops having opposite sides or legs of the loop close together and disposed in axially extending cooling passages provided in the machine.

The objects, nature and advantages of the invention will be more fully understood from the following description and claims in conjunction with the accompanying drawings which illustrate by way of example preferred embodiments of the invention.

In the drawings:

Fig. 1 is an axial section of a commutator electrical machine embodying the invention.

Fig. 2 is a partial axial section of a commutator electrical machine illustrating a modification.

In the accompanying drawings, the armature windings and resistance connections in accordance with the invention are shown diagrammatically, only two connections being shown in Fig. 1 and in Fig. 2, in order to simplify the drawings and facilitate an understanding of the invention.

In Figs. 1 and 2, there is shown the rotor of a motor having a shaft 1 carrying an armature which comprises a hub portion 2, a rim 3 supported on the hub by spaced arms or spokes 4 and an annular stack of magnetic sheets 5 having slots in which the elements 6 and 7 of the armature windings or coils are located. The commutator, mounted on the same shaft, comprises a hub portion 9, a rim 10 supported on the hub by spaced radial arms or spokes 11 and a plurality of commutator segments 12 mounted on the rim 10.

In the upper half of Fig. 1, there is shown a resistance connection 8 between a section 7 of the armature winding and a segment 12 of the commutator. The connection 8 comprises a resistance conductor forming a hairpin loop 8A, the opposite sides or legs of which are close together and substantially parallel. The loops 8A are disposed between the successive spokes 4 and located in the passageways which extend axially through the armature for the circulation of air or other cooling medium. As the instantaneous currents flowing in the two legs of the loop are always opposite to one another in direction, the inductive effect of these currents is practically zero. Hence, each resistance connection, in spite of its great length, presents practically no inductance and does not produce any harmful currents in the adjacent metallic portions of the machines such as the hub 2, spokes 4 and rim 3. As it is placed in the cooling passage between the spokes, the loop 8A is well cooled. It can have any desired length, which means that the length can be chosen to give the desired resistance value.

In the lower half of Fig. 1, there is shown another resistance connection 13 which forms an elongated hairpin loop 13A disposed in an axially extending passageway in the commutator between successive spokes 11. It will be understood that this loop 13A, from the point of view of its reactance and cooling, offers the same advantages as the loop 8A described above.

In Fig. 2, there are shown the resistance connections 14 having each an elongated hairpin loop portion 14A disposed in an axially extending cooling passage in the armature and a second elongated hairpin loop portion 14B disposed in an aligned cooling passage in the commutator. It will be understood that any or all of the resistance connections of the machines may have loop portions disposed in axial passageways through the armature, loop portions disposed in axially extending cooling passages through the commutator, or loop portions disposed both in passages through the armature and aligned passages through the armature. The resistance connections are formed of suitable wires, bars, rods, ribbons, etc. having the desired values and may be either straight or twisted. While preferred embodiments of the invention have been shown, by way of example, in the drawings, it will be understood that the invention is not limited to the specific examples shown and described.

What we claim and desire to secure by Letters Patent is:

1. In a commutator electrical machine, a rotor comprising an armature and a commutator having a plurality of segments, said rotor having cooling passages extending therethrough in an axial direction, windings on said armature and connections between the armature windings and individual commutator segments, said connections comprising resistance conductors in the form of elongated hairpin loops disposed in said passages approximately parallel to the axis of the rotor and having opposite legs of said loops close together.

2. In a commutator electrical machine, a commutator having a plurality of segments, an armature core having a plurality of cooling passages extending therethrough in an axial direction, windings on said armature core and connections between said windings and individual commutator segments, said connections comprising resistance conductors in the form of elongated hairpin loops disposed in said passages approximately parallel to the axis of the commutator and having opposite legs of said loops close together.

3. In a commutator electrical machine, a commutator having a plurality of segments and a plurality of cooling passages extending through the commutator in an axial direction, an armature core adjacent said commutator, windings on said armature core and connections between said windings and individual commutator segments, said connections comprising resistance conductors in the form of elongated hairpin loops disposed in said passages approximately parallel to the axis of the commutator and having opposite legs of said loops close together.

4. In a commutator electrical machine, a commutator having a plurality of segments and a plurality of cooling passages extending axially through the commutator in an axial direction, an armature core adjacent the commutator and having a plurality of cooling passages extending in an axial direction and communicating with said passages in the commutator, windings on said armature core and connections between said windings and individual commutator segments, said connections comprising resistance conductors in the form of elongated hairpin loops disposed in said passages approximately parallel to the axis of the commutator and armature and having opposite legs of said loops close together.

5. In an alternating current machine of the type having axially extending cooling air passages, a commutator and resistive connections between said commutator and the armature windings, a structure for eliminating induction phenomena produced by said connections, wherein said connections are in the form of narrow hairpin loops disposed in said cooling passages.

References Cited in the file of this patent

UNITED STATES PATENTS

| Number | Name | Date |
| --- | --- | --- |
| 780,047 | Lamme | Jan. 17, 1905 |

FOREIGN PATENTS

| Number | Country | Date |
| --- | --- | --- |
| 535,524 | France | Jan. 26, 1922 |